US011282126B1

(12) United States Patent
Hsiao et al.

(10) Patent No.: US 11,282,126 B1
(45) Date of Patent: Mar. 22, 2022

(54) LEARNING STAPLE GOODS FOR A USER

(71) Applicant: Maplebear, Inc., San Francisco, CA (US)

(72) Inventors: Daniel Hsiao, San Francisco, CA (US); Angadh Singh, Dublin, CA (US); Jason Scott, San Francisco, CA (US); Daniel Shilov, San Francisco, CA (US)

(73) Assignee: Maplebear Inc., San Francisco, CA (US)

( * ) Notice: Subject to any disclaimer, the term of this patent is extended or adjusted under 35 U.S.C. 154(b) by 145 days.

(21) Appl. No.: 16/450,935

(22) Filed: Jun. 24, 2019

(51) Int. Cl.
*G06Q 30/06* (2012.01)

(52) U.S. Cl.
CPC ..... *G06Q 30/0631* (2013.01); *G06Q 30/0633* (2013.01); *G06Q 30/0641* (2013.01)

(58) Field of Classification Search
CPC ........... G06Q 30/0631; G06Q 30/0633; G06Q 30/0641
USPC ...................................................... 705/26.7
See application file for complete search history.

(56) References Cited

U.S. PATENT DOCUMENTS

| | | | | |
|---|---|---|---|---|
| 2002/0147642 | A1* | 10/2002 | Avallone | G06Q 30/02 705/14.25 |
| 2013/0268317 | A1* | 10/2013 | Mattila | G06Q 30/02 705/7.29 |
| 2015/0278859 | A1* | 10/2015 | Sundaresan | G06Q 30/0255 705/14.53 |
| 2016/0232624 | A1* | 8/2016 | Goldberg | G06Q 30/02 |
| 2016/0350832 | A1* | 12/2016 | Franklin | G06Q 30/0633 |
| 2017/0345072 | A1* | 11/2017 | Chang | G06Q 20/4014 |
| 2020/0410573 | A1* | 12/2020 | Kraus | G06Q 30/0264 |

OTHER PUBLICATIONS

Gupta, Sachin, "A Regime-Switching Model of Cyclical Category Buying", May 2011, Marketing Science (Year: 2011).*
Kooti, Farshad, "Predicting and Modeling Human Behavioral Changes Using Digital Traces", Dec. 2016, University of Southern California (Year: 2016).*

* cited by examiner

*Primary Examiner* — Matthew E Zimmerman
*Assistant Examiner* — Thomas Joseph Sullivan
(74) *Attorney, Agent, or Firm* — Fenwick & West LLP

(57) ABSTRACT

An online concierge system accesses an order history database, which describes historical orders for a plurality of users. Each historical order comprises a list of items selected by a user from a plurality of items. The online concierge system determines user streaks, each user streak based on a number of consecutive orders placed by a user that include a particular item. The online concierge system calculates an overall streak distribution based on the user streaks. For each item of at least a subset of the plurality of items, the online concierge system calculates a streak statistic based on a corresponding subset of user streaks and the overall streak distribution. The online concierge system selects a set of staples items for a user based on the streak statistics for the set of staple items and generates a display for the user with a selectable list of the set of staple items.

20 Claims, 11 Drawing Sheets

Orders 604

Generic Item Order Sequence Chart 600

| | Order 1 604A | Order 2 604B | Order 3 604C | Order 4 604D | Order 5 604E | Order 6 604F | Order 7 604G |
|---|---|---|---|---|---|---|---|
| Milk 602A | 2 | 0 | 1 | 1 | 2 | 0 | 1 |
| Bread 602B | 1 | 1 | 1 | 1 | 2 | 0 | 1 |
| Cumin 602C | 1 | 0 | 0 | 0 | 0 | 0 | 1 |

Generic Items 602

Generic Item Quantities by Order 606

FIG. 6A

| Generic Items 602 | User Streaks 608 |
|---|---|
| Milk 602A | 3 |
| Bread 602B | 5 |
| Cumin 602C | 1 |

FIG. 6B

LEARNING STAPLE GOODS FOR A USER

BACKGROUND

This disclosure relates generally to creating a staples list for shopping on an online concierge system. More particularly, the disclosure relates to using statistical algorithm to determine staple items to be shown to a customer.

In current online concierge systems, customers add items to an online shopping cart from a list of available items at a retailer. Though customers may use an online concierge system often, they still have to scroll through long lists of item options to select items they order on a regular basis. Some online concierge systems may provide an option for customers to reorder items from their last order on the online concierge system. However, customers usually adjust their list of items between orders. For example, a customer may order cleaning supplies in one order, and not need to re-order the same cleaning supplies in their following order. In addition, online concierge systems might use the quantity of an item a customer has previously ordered to predict items that a customer may want to include in a new order. However, this option fails to capture the intricacies of customers' shopping habits. For example, if a customer is having a party and orders 10 bags of chips and 10 jars of salsa, the online concierge system might mistake this order as indicating that the customer has a strong preference for chips and salsa, rather than identifying this as an anomalous order.

SUMMARY

To provide a more accurate and useful list of items that a user is likely to include in an online shopping order, the online concierge system generates a list of staples based on streaks of item purchases across the general population and streaks of item purchases made by a particular user. Providing a staples list of staple items to a customer based on purchasing streak statistics improves user experience and efficiency of use for users of an online concierge system (referred to herein as "users" or "customers"). For example, a customer may order a number of items on a weekly or near-weekly basis from an online concierge system. If a customer repeatedly orders the same item in consecutive orders, the item is likely a staple item for the customer. Through analyzing user streaks, or the maximum number of times a customer ordered a particular item consecutively, the online concierge system predicts a general staples list that indicates staple items bought by the general population on the online concierge system. In some embodiments, the online concierge system uses the general staples list and a customer's order history to determine a customer staples list for the customer indicating likely staple items for the customer. In other embodiments, the online concierge system calculates personalized streak statistics individualized for a customer and uses the personalized streak statistics to determine the customer staples list. A customer staples list typically contains different items from the list of items the customer most recently ordered, or the list of items the customer has ordered with the greatest frequency. The online concierge system displays the customer staples list to the customer in a user interface, such that the customer may quickly select the customer staples list or a subset of the customer staples list to add to an order.

More particularly, in some embodiments, the online concierge system accesses an order history database. The order history database describes a plurality of historical orders for a plurality of users. Each historical order in the order history database comprises a list of items selected by a respective user form a plurality of items. The online concierge system determines a plurality of user streaks. Each user streak is based on a number of consecutive orders placed by a respective user of the plurality of users that include a respective item of the plurality of items. The online concierge system calculates an overall streak distribution for the plurality of items based on the plurality of user streaks. For each item of at least a subset of the plurality of items, the online concierge system calculates a streak statistic for the item. The streak statistic is based on a corresponding subset of the plurality of user streaks and the overall streak distribution. The online concierge system selects a set of staples items for a particular user based on the streak statistics for the set of staple items and generates a display for the particular user with a selectable list. The online concierge system generates a staples ordering interface for the particular user for display. The staples ordering interface includes a selectable list of the selected set of staple items.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

BRIEF DESCRIPTION OF DRAWINGS

FIG. 6A is an example generic item order sequence chart, according to one embodiment.

FIG. 6B depicts user streaks from the generic item order sequence chart, according to one embodiment.

The figures depict embodiments of the present invention for purposes of illustration only. One skilled in the art will readily recognize from the following description that alternative embodiments of the structures and methods illustrated herein may be employed without departing from the principles of the invention described herein.

DETAILED DESCRIPTION

Environment of an Online Concierge System

Figure 1:
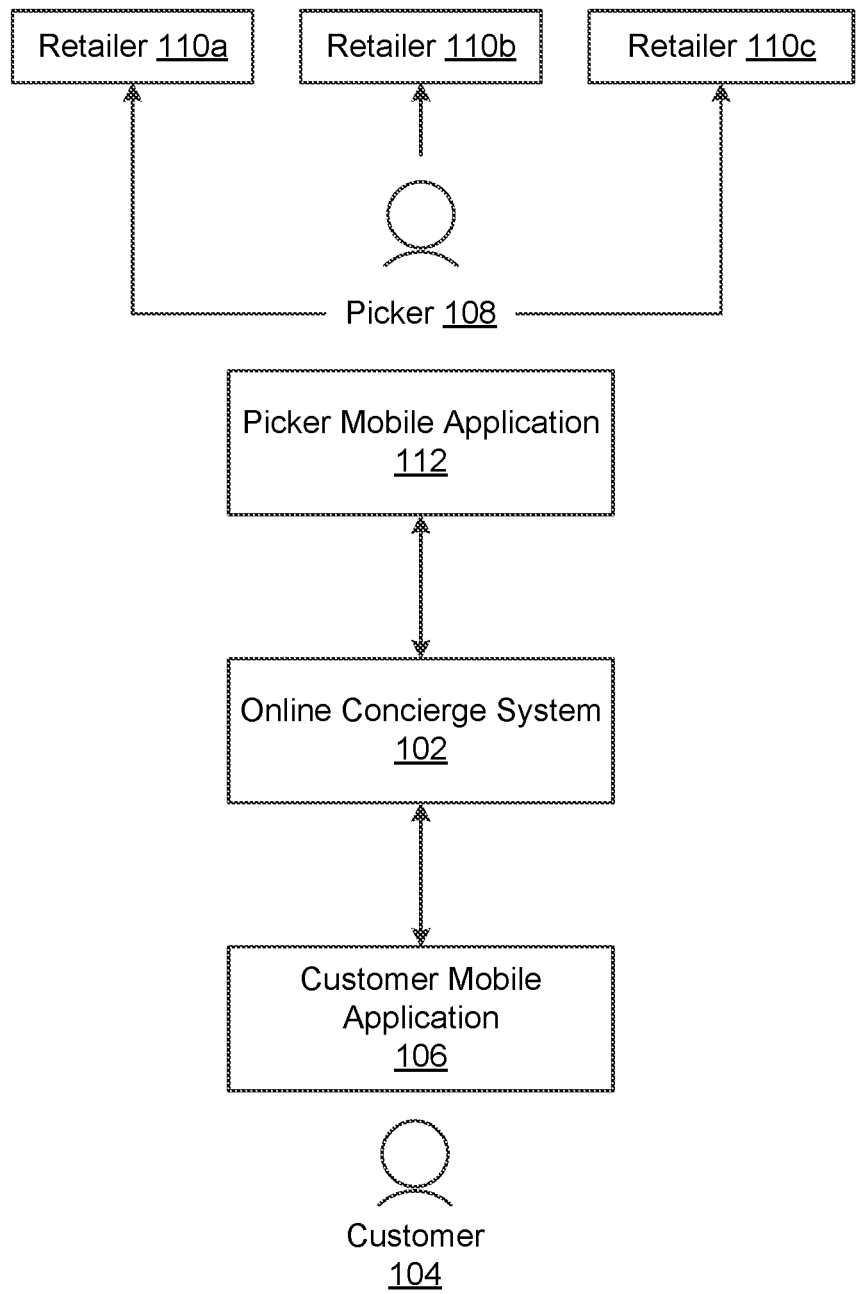
FIG. 1 illustrates the environment of an online concierge system, according to one embodiment.

FIG. 1 illustrates the environment 100 of an online concierge system 102, according to one embodiment. The figures use like reference numerals to identify like elements. A letter after a reference numeral, such as "110a," indicates that the text refers specifically to the element having that particular reference numeral. A reference numeral in the text without a following letter, such as "110," refers to any or all of the elements in the figures bearing that reference numeral. For example, "110" in the text refers to reference numerals "110a" and/or "110b" in the figures.

The environment 100 includes an online concierge system 102. The online concierge system 102 is configured to receive orders from one or more customers 104 (only one is shown for the sake of simplicity). An order specifies a list of goods (items or products) to be delivered to the customer 104. The order also specifies the location to which the goods are to be delivered, and a time window during which the goods should be delivered. In some embodiments, the order specifies one or more retailers from which the selected items should be purchased. The customer may use a customer mobile application (CMA) 106 to place the order; the CMA 106 is configured to communicate with the online concierge system 102.

The online concierge system 102 is configured to transmit orders received from customers 104 to one or more pickers 108. A picker 108 may be a contractor, employee, or other person (or entity) who is enabled to fulfill orders received by the online concierge system 102. The environment 100 also includes three warehouses 110a, 110b, and 110c (only three are shown for the sake of simplicity; the environment could include hundreds of warehouses). The warehouses 110 may be physical retailers, such as grocery stores, discount stores, department stores, etc., or non-public warehouses storing items that can be collected and delivered to customers. Each picker 108 fulfills an order received from the online concierge system 102 at one or more warehouses 110, delivers the order to the customer 104, or performs both fulfillment and delivery. In one embodiment, pickers 108 make use of a picker mobile application 112 which is configured to interact with the online concierge system 102.

Online Concierge System

Figure 2:
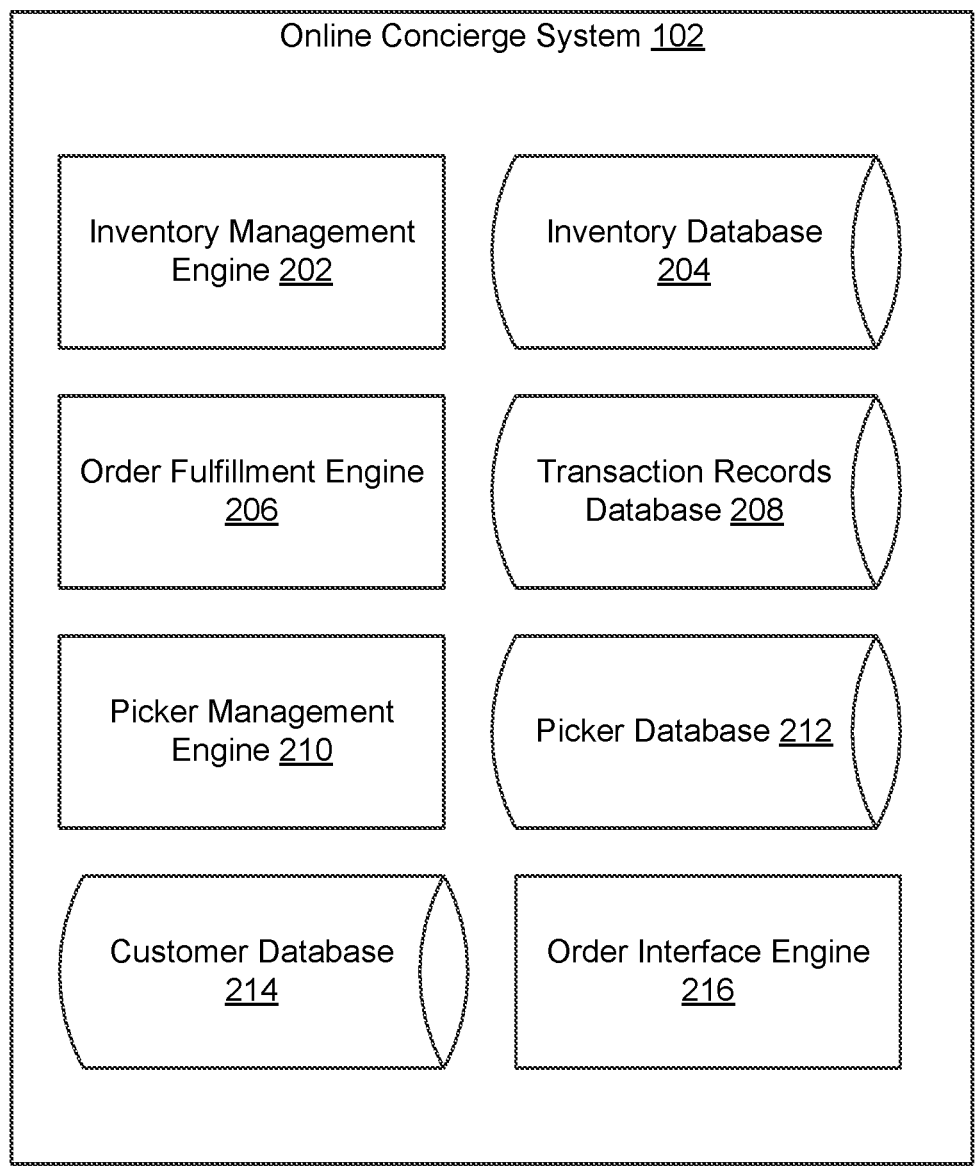
FIG. 2 is a block diagram of an online concierge system, according to one embodiment.

FIG. 2 is a block diagram of an online concierge system 102, according to one embodiment. The online concierge system 102 includes an inventory management engine 202, which interacts with inventory systems associated with each warehouse 110. In one embodiment, the inventory management engine 202 requests and receives inventory information maintained by the warehouse 110. The inventory of each warehouse 110 is unique and may change over time. The inventory management engine 202 monitors changes in inventory for each participating warehouse 110. The inventory management engine 202 is also configured to store inventory records in an inventory database 204. The inventory database 204 may store information in separate records—one for each participating warehouse 110—or may consolidate or combine inventory information into a unified record. Inventory information includes both qualitative and qualitative information about items, including size, color, weight, SKU, serial number, and so on. In one embodiment, the inventory database 204 also stores purchasing rules associated with each item, if they exist. For example, age-restricted items such as alcohol and tobacco are flagged accordingly in the inventory database 204.

The online concierge system 102 also includes an order fulfillment engine 206 which is configured to synthesize and display an ordering interface to each customer 104 (for example, via the customer mobile application 106). The order fulfillment engine 206 is also configured to access the inventory database 204 in order to determine which products are available at which warehouses 110. The order fulfillment engine 206 determines a sale price for each item ordered by a customer 104. Prices set by the order fulfillment engine 206 may or may not be identical to in-store prices determined by retailers (which is the price that customers 104 and pickers 108 would pay at retail warehouses). The order fulfillment engine 206 also facilitates transactions associated with each order. In one embodiment, the order fulfillment engine 206 charges a payment instrument associated with a customer 104 when he/she places an order. The order fulfillment engine 206 may transmit payment information to an external payment gateway or payment processor. The order fulfillment engine 206 stores payment and transactional information associated with each order in a transaction records database 208.

In some embodiments, the order fulfillment engine 206 also shares order details with warehouse 110. For example, after successful fulfillment of an order, the order fulfillment engine 206 may transmit a summary of the order to the appropriate warehouse. The summary may indicate the items purchased, the total value of the items, and in some cases, an identity of the picker 108 and customer 104 associated with the transaction. In one embodiment, the order fulfillment engine 206 pushes transaction and/or order details asynchronously to warehouse systems. This may be accomplished via use of webhooks, which enable programmatic or system-driven transmission of information between web applications. In another embodiment, warehouse systems may be configured to periodically poll the order fulfillment engine 206, which provides detail of all orders which have been processed since the last request.

The order fulfillment engine 206 may interact with a picker management engine 210, which manages communication with and utilization of pickers 108. In one embodiment, the picker management engine 210 receives a new order from the order fulfillment engine 206. The picker management engine 210 identifies the appropriate warehouse 110 to fulfill the order based on one or more parameters, such as the contents of the order, the inventory of the warehouses, and the proximity to the delivery location. The picker management engine 210 then identifies one or more appropriate pickers 108 to fulfill the order based on one or more parameters, such as the pickers' proximity to the appropriate warehouse 110 (and/or to the customer 104), his/her familiarity level with that particular warehouse 110, and so on. Additionally, the picker management engine 210 accesses a picker database 212 which stores information describing each picker 108, such as his/her name, gender, rating, previous shopping history, and so on. The picker management engine 210 transmits the list of items in the order to the picker 108 via the picker mobile application 112. The picker database 212 may also store data describing the sequence in which the pickers' picked the items in their assigned orders.

As part of fulfilling an order, the order fulfillment engine 206 and/or picker management engine 210 may access a customer database 214 which stores information describing each customer. This information could include each customer's name, address, gender, shopping preferences, favorite items, stored payment instruments, and so on.

Figure 3A:
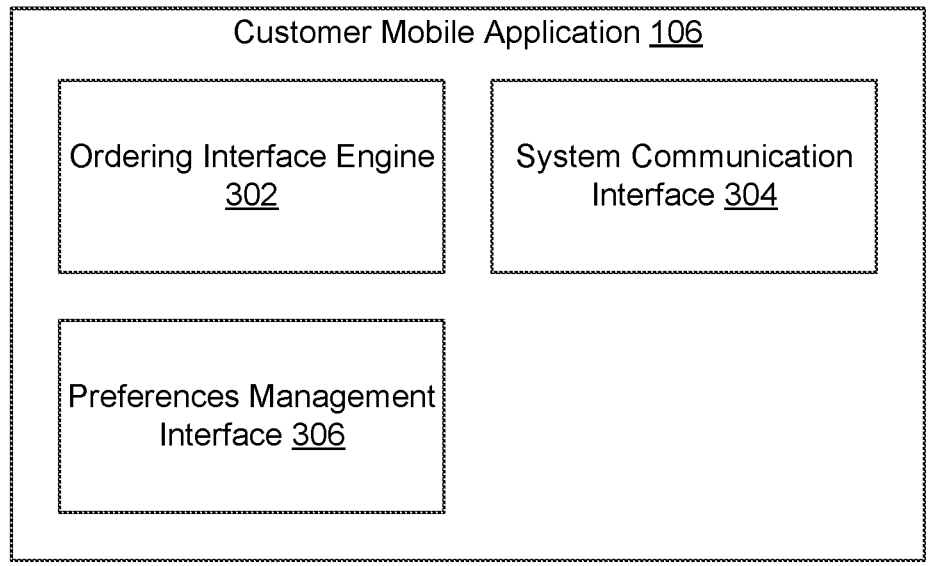
FIG. 3A is a block diagram of the customer mobile application (CMA), according to one embodiment.

FIG. 3A is a block diagram of the customer mobile application (CMA) 106, according to one embodiment. The customer 104 accesses the CMA 106 via a client device, such as a mobile phone, tablet, laptop, or desktop computer. The CMA 106 may be accessed through an app running on the client device or through a website accessed in a browser. The CMA 106 includes an ordering interface 302, which provides an interactive interface with which the customer 104 can browse through and select products and place an order. The CMA 106 also includes a system communication interface 304 which, among other functions, receives inventory information from the online concierge system 102 and transmits order information to the online concierge system 102. The CMA 106 also includes a preferences management interface 306 which allows the customer 104 to manage basic information associated with his/her account, such as his/her home address and payment instruments. The preferences management interface 306 may also allow the user to manage other details such as his/her favorite or preferred warehouses 110, preferred delivery times, special instructions for delivery, and so on. The preferences management interface 306 may also allow the customer 104 to manage a list of staple items.

Figure 3B:
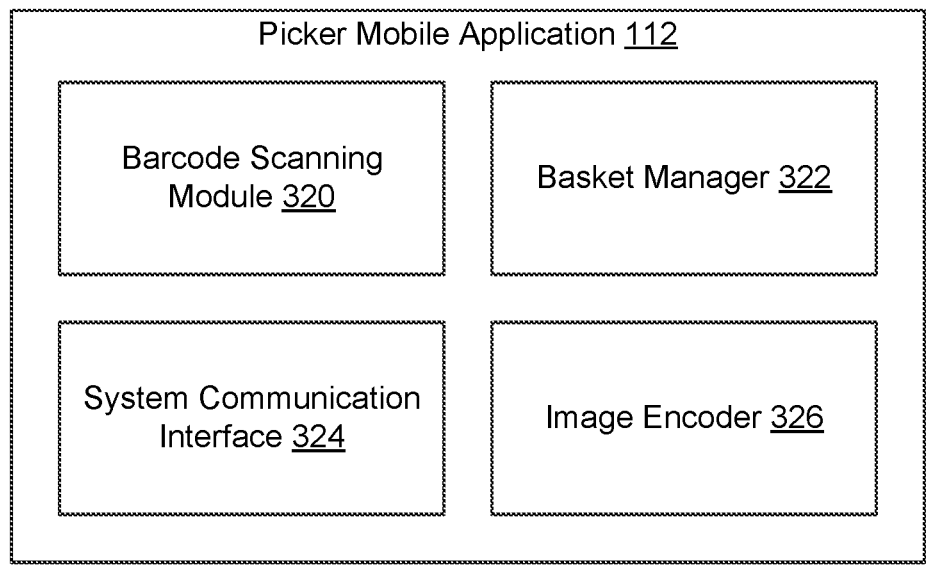
FIG. 3B is a block diagram of the picker mobile application (PMA), according to one embodiment.

FIG. 3B is a block diagram of the picker mobile application (PMA) 112, according to one embodiment. The picker 108 accesses the PMA 112 via a mobile client device, such as a mobile phone or tablet. The PMA 112 may be accessed through an app running on the mobile client device or through a website accessed in a browser. The PMA 112 includes a barcode scanning module 320 which allows a picker 108 to scan an item at a warehouse 110 (such as a can of soup on the shelf at a grocery store). The barcode scanning module 320 may also include an interface which allows the picker 108 to manually enter information describing an item (such as its serial number, SKU, quantity and/or weight) if a barcode is not available to be scanned. The PMA 112 also includes a basket manager 322 which maintains a running record of items collected by the picker 108 for purchase at a warehouse 110. This running record of items is commonly known as a "basket". In one embodiment, the barcode scanning module 320 transmits information describing each item (such as its cost, quantity, weight, etc.) to the basket manager 322, which updates its basket accordingly. The PMA 112 also includes an image encoder 326 which encodes the contents of a basket into an image. For example, the image encoder 326 may encode a basket of goods (with an identification of each item) into a QR code which can then be scanned by an employee of the warehouse 110 at check-out.

The PMA 112 also includes a system communication interface 324, which interacts with the online concierge system 102. For example, the system communication interface 324 receives an order from the online concierge system 102 and transmits the contents of a basket of items to the online concierge system 102.

Figure 4:
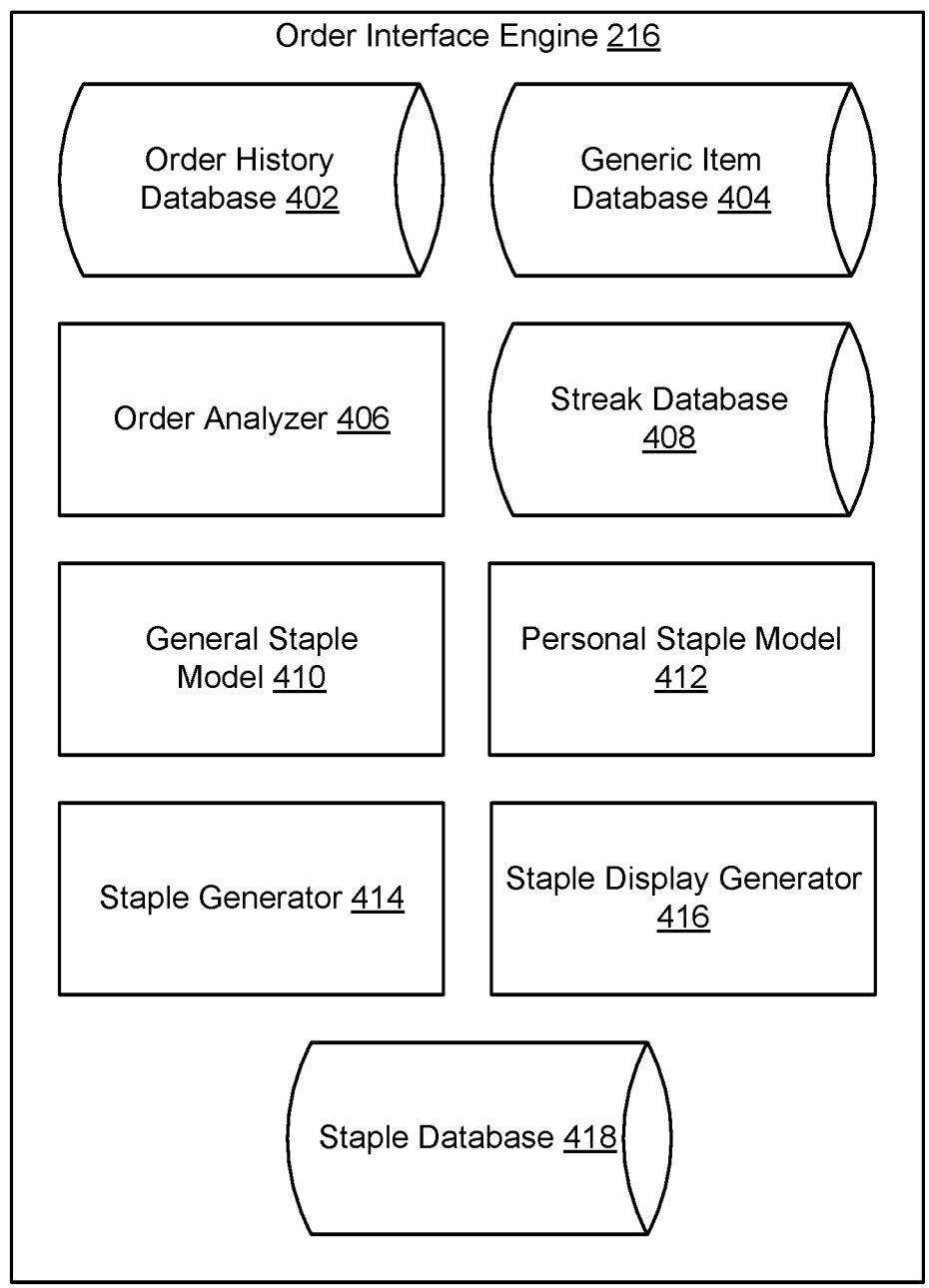
FIG. 4 is a block diagram of the order interface engine, according to one embodiment.

FIG. 4 is a block diagram of the order interface engine 206, according to one embodiment. The order interface engine 206 consists of an order history 402, generic item database 404, order analyzer 406, streak database 408, general staple model 410, personal staple model 412, staple generator 414, staple display generator 416, and staple database 418. In some embodiments, the order interface engine 206 has more or different components than those shown in FIG. 4. In other embodiments, the components shown in FIG. 4 may be combined or removed.

The order history database 402 stores data describing historical orders, which are orders previously made by customers through the online concierge system 102. Each historical order includes a list of items the customer purchased for that order. When a customer uses the customer mobile application 106 to place an order, the order history database 402 stores information describing the order, including identifiers of items ordered, quantity of items ordered, time of the order, and date of the order, in relation a customer identifier associated with the customer. In some embodiments, the order history database 402 stores the information describing the historical orders in an index or array. In some embodiments, the order history database 402 is a subset of the data stored in the customer database 214, and the order interface engine 206 retrieves order history data for customers of the online concierge system 102 from the customer database 214.

The generic item database 404 stores item to generic item correlations. For example, the generic item database 404 stores items in relation to generic items in an index. A generic item describes a generic version of a particular item, such that the generic item does not identify the brand or sub-type of the item. For example, the generic item database 404 correlates items such as "Moo Moo Organic Milk," "Greener Pastures 2% Milk," and "Cow Bell Whole Milk" to the generic item "milk." This removes the connection to specific types of milk, like "Whole Milk," and specific brands of milk, like "Moo Moo." As another example, the item "Liquid Gold Chocolate Milk" is connected to the generic item "chocolate milk" rather than the generic item "milk" since, in most cases, chocolate milk is not used as a substitute for regular milk. In some embodiments, the generic item database 404 includes a set of rules or a machine-learned model that analyzes the name of a particular item to determine the associated generic item. For example, a rule for identifying items that fall within the generic item "milk" specifies that item descriptions that include the word "milk" along with a milkfat word (e.g., "skim," "2%," "whole"), but do not include flavor words (e.g., "chocolate," "strawberry," etc.) or milk substitute words (e.g., "soy," "oat," "almond"), are labeled as the generic item "milk."

The order analyzer 406 determines and stores user streaks for generic items. For each customer, the order analyzer 406 retrieves all historical orders or a subset of historical orders (e.g., orders from the last year) placed by the customer from the order history database 402. The order analyzer 406 determines a set of generic items corresponding to the items in the historical orders using the generic item database 404. For each distinct generic item in a customer's order history, the order analyzer 406 determines streaks for the generic item across the retrieved historical orders for the customer, where each streak indicates the number of times the generic item was ordered consecutively by the customer. A single generic item (e.g., milk) may have multiple streaks for a given customer, e.g., if the customer includes milk in three consecutive orders, and after an order with no milk, includes milk in four other consecutive orders. From the calculated streaks, the order analyzer 406 determines a user streak, which is the longest streak by the customer for the generic item. The order analyzer 406 stores the user streaks in relation to the associated generic item and customer identifier in the streak database 408. User streaks are further described in relation to FIGS. 6A and 6B.

Once the order analyzer 406 has determined the user streaks, the order analyzer 406 calculates a streak distribution for each generic item using the user streaks. In some embodiments, the order analyzer 406 calculates streak distributions based on the user streaks for engaged customers, rather than all customers. Engaged customers may be customers that meet a set of rules for minimum engagement, e.g., customers that have used the online concierge system 102 for longer than a time threshold (e.g., more than one month) and have made a threshold number of orders (e.g., at least three orders). To calculate a streak distribution for a generic item, the order analyzer 406 calculates an average and a standard deviation of the user streaks for each engaged customer who ordered the generic item. The order analyzer 406 then determines an overall streak distribution for all generic items. To calculate the overall streak distribution across all items, the order analyzer 406 calculates an average and a standard deviation of all of the user streaks across all of the generic items ordered by engaged customers. The order analyzer 406 stores the streak distributions and the overall streak distribution, also known collectively as streak statistics, in the streak database 408. The order analyzer 406 stores each streak distribution in relation the generic item in the streak database 408. In some embodiments, the streak database 408 stores the user streaks and streak distributions in an index that may be queried by the general staple model 410 and the personal staple model 412.

The general staple model 410 determines and stores a general staples list. For each generic item, the general staple model 410 retrieves the streak distribution associated with the generic item and the overall streak distribution from the streak database 408. For a given generic item, the general staple model 410 compares the streak distribution of the generic item to the overall streak distribution in a paired T-test to determine the item streak statistic, $T_{item}$, for the generic item using Equation 1, below. In Equation 1, $\mu_{item}$ is the average of the user streaks for the generic item, $s_{item}$ is the standard deviation of the user streaks for the generic item, $\mu_{overall}$ is the average of the all of the user streaks, $s_{overall}$ is the standard deviation of all of the user streaks, $n_{item}$ is the number of user streaks for the generic item, $n_{overall}$ is the total number of user streaks for all generic items.

$$T_{item} = \frac{\mu_{item} - \mu_{overall}}{\sqrt{\frac{s_{item}^2}{n_{item}} + \frac{s_{overall}^2}{n_{overall}}}} \quad \text{Equation 1}$$

The general staple model 410 stores the item streak statistic in the streak database 408. The item streak statistic may be considered part of the collective group of streak statistics. After calculating the item streak statistic for a generic item, the general staple model 410 compares the item streak statistic to a general threshold value. If the item streak statistic is over the general threshold value, the general staple model 410 adds the generic item to the general staples list. For example, for a general threshold value of 3.5, generic items with an item streak statistic above 3.5 would be added to the general staples list. In other embodiments, the general staple model 410 adds a set of top generic items to the general staples list. For example, the general staple model 410 adds the top 30 generic items with the highest item streak statistics to the general staples list. In other embodiments, the general staple model 410 adds generic items with an item streak statistic within a threshold percentile of the T-distribution with a threshold degree of freedom to the general staples list. In general, generic items with a large, positive item streak statistic are likely to be a staple, while generic items with a negative item streak statistic are likely to be anti-staples. For example, the generic item "bread" with a high, positive item streak statistic (e.g., 100) is likely to be a staple, while garlic powder, with a very low item streak statistic of (e.g., −200), is not a staple. In some embodiments, the general staple model 410 creates and stores multiple general staples lists, one for each retailer or class of retailer. For example, generic items such as "bananas" and "eggs" would be listed in general staples lists for grocery retailers, but not for office supply retailers. In these embodiments, the item streak statistic is calculated using an overall streak distribution for generic items related to a retailer or set of retailers, rather than all possible generic items.

The personal staple model 412 determines and stores personalized streak statistics. Personalized streak statistics describe user specific preferences for specific generic items and may also be considered part of the collective group of streak statistics. To determine the personalized streak statistics for a given customer, the personal staple model 412 retrieves user streaks for that customer, the associated generic items, and the overall streak distribution from the streak database 408. For each associated generic item, the personal staple model 412 calculates a personalized streak statistic using Equation 2, where $SS_{personal}$ is the personalized streak statistic, $streak_{customer}$ is the maximum user streak for the generic item, $\mu_{overall}$ is the average of the overall streak distribution, and $s_{overall}$ is the standard deviation of all of the user streaks for all generic items.

$$SS_{personal} = \frac{streak_{customer} - \mu_{overall}}{s_{overall}} \quad \text{Equation 2}$$

The personal staple model 412 stores the personalized streak statistics in relation to the generic items and the customer identifier in the streak database 408. In some embodiments, the personal staple model 412 stores the personalized streak statistics separately in an index.

The staple generator 414 creates and updates customer staples lists for customers. In some embodiments, the staple generator 414 determines whether each customer is eligible to receive a staples list, and creates staples lists for eligible customers. Eligible customers satisfy a set of requirements, such as having ordered items via the online concierge system 102 at least twice. For newer customers, the staple generator 414 creates an initial customer staples list based mainly on the general staples determined by the general staple model 410. In some embodiments, newer customers have been using the online concierge system 102 for less than a particular amount of time (e.g., less than two months) or have placed less than a particular amount of orders (e.g., less than six orders). The staple generator 414 retrieves historical orders associated with each customer from the order history database 402 and uses the generic item database 404 to determine the generic items ordered by the customer. The staple generator 414 compares each generic item ordered by the customer to the general staples list from the general staple model 410. Generic items both in the set of generic items previously ordered by the customer and on the general staples list qualify as a staple item for the customer and are added to the customer staples list. Generic items in the set of generic items previously ordered by the customer but not on the general staples list are not added to the customer staples list. The staples generator 414 may update a customer staples list when the customer places a new order that includes a generic item on the general staples list, but not previously included on the customer staples list.

For customers that have used the online concierge system 102 for a longer period of time, the staple generator 414 creates customer staples lists based on personalized streak statistics. In some embodiments, such customers have been using the online concierge system 102 for at least particular amount of time (e.g., at least two months) or have placed at least a particular amount of orders (e.g., at least six orders). The staple generator 414 may create a new customer staples list, which replaces the customer staples list made when the customer was a newer customer. The staple generator 414 retrieves historical orders associated with each customer from the order history database 402 and uses the generic item database 404 to determine the generic items ordered by the customer. For each generic item ordered by the customer, the staple generator 414 retrieves the personalized streak statistic from the streak database 408 and compares the personalized streak statistic to a threshold value for determining if an item is a personal staple, referred to as a "personal staple threshold value". If the personalized streak statistic for a generic item is greater than the personal staple threshold value, the staple generator 414 includes the generic item in the customer staples list. If the personalized streak statistic is less than the personal staple threshold value, the staple generator 414 does not include the generic item in the customer staples list.

Once a customer staples list based on the personalized streak statistics has been stored, the staple generator 414 may perform an updating process for the stored customer staples list, e.g., each time the customer places a new order with the online concierge system 102. For example, after the customer places a new order, the order analyzer 406 updates the user streaks for the user based on the new order, and the personal staple model 412 updates the personalized streak statistics for the items included in the order based on the updated user streaks. The staple generator 414 retrieves data describing the new order from the order history database 402 and determines the generic items for the items included in the new order using the generic item database 404. The staple generator 414 also retrieves the customer staples list for the customer from the staple database 418. For each generic item from the new order, the staple generator 414 retrieves the updated personalized streak statistic for the item from the streak database 408. For generic items from the new order, the staple generator 414 compares the personalized streak statistic to the personal staple threshold value. If the personalized streak statistic is greater than the personal staple threshold value, the staple generator 414 adds the generic item to the customer staples list. Otherwise, the staple generator 414 does not add the generic item to the customer staples list.

Once the staple generator 414 has determined a customer staples list, the staple generator 414 may apply one or more filtering rules to each generic item on the customer staples list to filter items that, despite high streak statistics, should not be included on the list. The staple generator 414 removes generic items from the customer staples list that do not satisfy the filtering rules. To apply the filtering rules, the staple generator 414 retrieves information describing the customer's order history for each generic item, e.g., from the order history database 402. In one embodiment, a generic item satisfies the filtering rules if the generic item passes a frequency rule, an order number rule, and a recency rule. Otherwise, if the generic item does not satisfy all of the filtering rules, the staple generator 414 removes the generic item from the customer staples list. To satisfy the frequency rule, the customer has ordered the generic item with a frequency greater than a frequency threshold (e.g., in more than 10% of the customer's orders). To satisfy the order number rule, the customer has ordered the generic item in more orders than an order number threshold (e.g., at least three orders). To satisfy the recency rule, the customer has placed an order with the generic item within an amount of time less than a recency threshold (e.g., within the past 90 days). To apply these filtering rules, the staple generator 414 determines a frequency the generic item has been ordered, the number of orders containing the generic item, and the how recently the generic item was ordered based on the retrieved order history and applies the filtering rules to the generic item. If the generic item passes the filtering rules, the staple generator 414 keeps the generic item on the customer staples list. Otherwise, the generic item is removed from the customer staples list. The filtering rules may be applied at different places in the process of determining the customer staples list, so long as the filtering rules are applied to each generic item. After the filtering rules have been applied, the staples generator 414 stores the customer staples list in association with the customer identifier in the staple database 418. In other embodiments, different combinations of the filtering rules and/or additional filtering rules may be used.

The staple display generator 416 determines items to be displayed in a staples list for each customer and creates a staples ordering interface for display to the customer. For each customer, the staple display generator 416 retrieves the customer staples list from the staple database 418. The staple display generator 416 retrieves all historical orders for the customer from the order history database 402 and the associated generic items from the generic item database 404. For each generic item in the customer staples list, the staple display generator 416 matches the generic item to a set of one or more items from the historically ordered items. For example, if a generic item in the customer staples list is "milk," the staple display generator 416 may determine that the customer has ordered "Moo Moo Organic Milk" in one previous order from one retailer, and "Greener Pastures 2% Milk" in seven previous orders from another retailer. For this generic item, the staple display generator 416 chooses a one item from the set of items to be displayed to the customer as part of the staples list. If the customer has ordered multiple different items corresponding to a single generic item, the staple display generator 416 may use one or more rules to determine which of the items to include in the staples list. For example, the staple display generator 416 chooses an item based on the amount of times that item was ordered, e.g., selecting "Greener Pastures 2% Milk". As another example, the staple display generator 416 chooses an item based on the retailer the customer has selected to order from, e.g., selecting "Moo Moo Organic Milk" if the customer has selected to order from the first retailer. As another example, the staple display generator 416 ranks the items associated with a generic item based on customer reviews or popularity among all customers and chooses the highest ranked item for display. The staple display generator 416 creates a staples ordering interface showing the chosen items representing the staples list and sends the staples ordering interface for display to the customer in a user interface, e.g., to the order interface engine 302. In some embodiments, the staples ordering interface may also include features that allow the customer to interact with items on the staples list. The staples ordering interface is further described in relation to FIG. 5.

In some embodiments, the staple display generator 416 also generates a user interface with a staples configuration page for display to the customer. The staples configuration page shows the customer a list of the staples on the customer staples list determined by the order interface engine 216 and stored in the staple database 418. The staples configuration page may display either a list of generic items or a list of particular items. By interacting with the staples configuration page, the customer can manually adjust their staples, e.g., by removing staple items, adding additional staple items, or selecting a different brand of a particular staple item. The adjustments made by the customer may permanently update the customer staples list stored in the staple database 418. For example, the customer may remove the generic item "peanuts" using their staple configuration page after learning they have a peanut allergy. Then, when the staple display generator 416 sends the staple ordering interface for display to the customer, the staple ordering list will not show any type of peanuts as a staple item for the customer.

Figure 5:
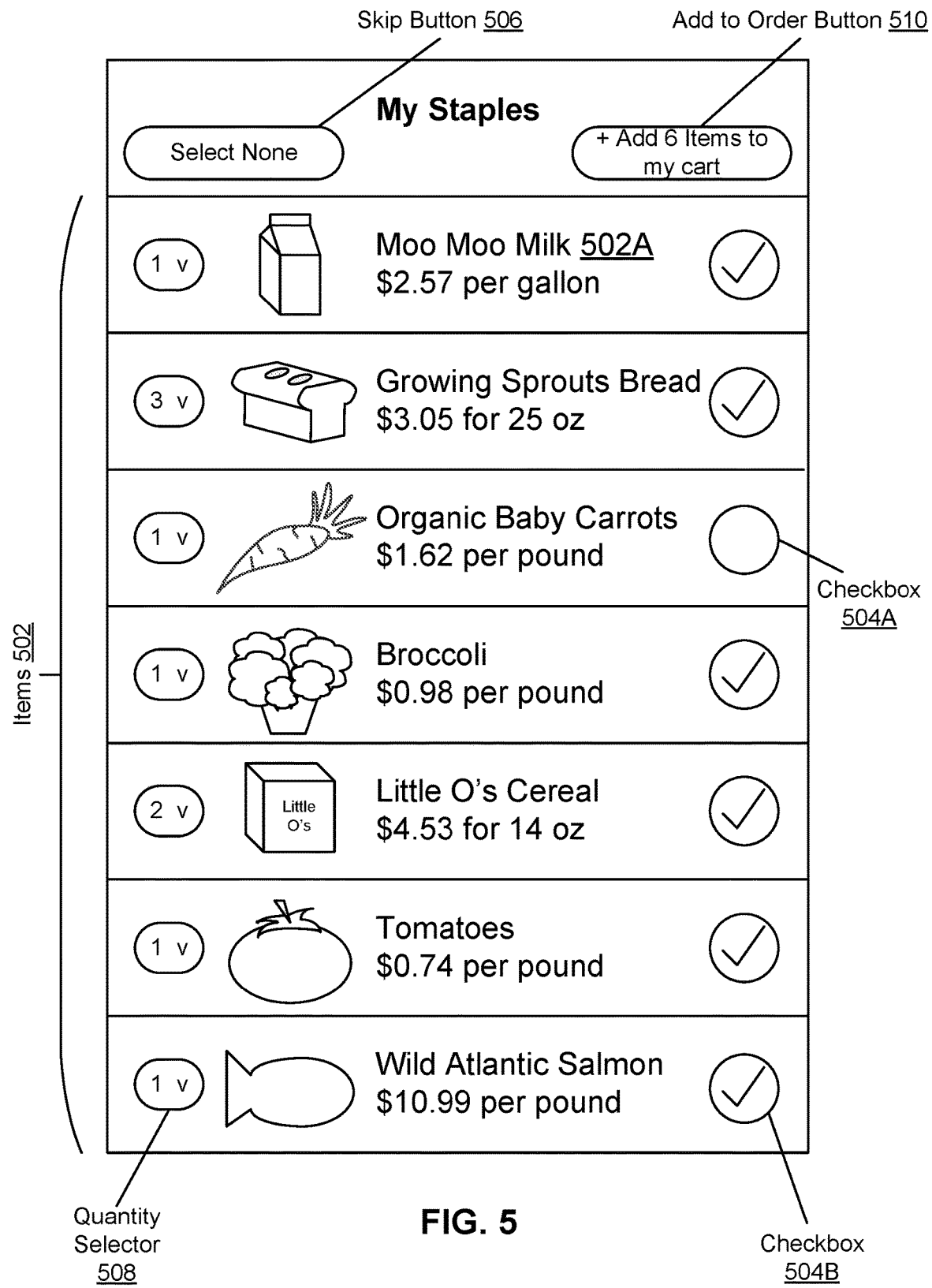
FIG. 5 is an example of a staples ordering interface, according to one embodiment.

FIG. 5 is an example of a staples ordering interface 500, according to one embodiment. The staples ordering interface 500 is a user interface that shows items 502 in a selectable staples list displayed to a customer. The items 502 have specific types or brands, such as Moo Moo Milk 502A, and may be displayed with information such as the price of the item per quantity or an image depicting the item. The customer may interact with the staples ordering interface 500 to select items 502 to purchase. In this example, each item is associated with a checkbox 504 that the customer may use to deselect items by unchecking the checkbox 504A or select by checking the checkbox 504B. In some embodiments, the staples ordering interface 500 may be displayed with all of the checkboxes 504 checked, and the customer can selectively remove certain items. The customer may also toggle the skip button 506 to deselect all of the items in the staples list and/or proceed to another ordering interface. In some embodiments, the staples ordering interface 500 also includes a button that the customer may toggle to select all of the items in the staples list (not shown). The customer may also use the quantity selector 508 to choose a quantity of each item. In some embodiments, the quantity selector is a drop-down menu. In other embodiments, the quantity selector receives a value input on a keyboard or keypad. Once the customer has made their item selections, the customer may use the add to order button 510 to add the selected items to their online shopping cart for purchase. In other embodiments, the staples ordering interface 500 may include more interactive elements for the user to remove/add items to their staples list, purchase items, set up orders in advances, and more. The staples ordering interface 500 allows a user to quickly add their staple items to their shopping cart. For example, if the user wishes to include all of the listed staples items, the user can quickly review and select all of the items in one click. The staples ordering interface 500 also allows a user to efficiently adjust their staple items for a given order, e.g., by unchecking a few items, and adding the rest to the order.

FIG. 6A is an example generic item order sequence chart 600, according to one embodiment. The generic item order sequence chart 600 shows the quantities of generic items 602 ordered with each order 604 a customer placed. The generic items 602 represent items included in the customer's order history. In this example, the generic items 602 are a subset of the items ordered by the same customer for whom the staples ordering interface 500 is generated. For example, the item Moo Moo Milk 502A shown in FIG. 5 is identified by the generic item milk 602A in FIG. 6A. Customers may order certain items, like milk, frequently, but each have different preferences for types or brand. To remove the influence of the type or brand, the order interface engine 216 calculates item streak statistics and personalized streak statistics based on generic items instead of the items themselves. For orders 604 placed by the customer, the item order sequence chart 600 shows generic item quantities by order 606. For example, this customer ordered no milk 602A or cumin 602C in order 2 604B, but did order a loaf of bread 602B. The generic item order sequence chart 600 is used to determine the streaks of each generic item 602. For example, the generic item order sequence chart 600 includes streaks for milk 602A, representing consecutive orders that included the generic item milk 602A. The streak lengths are 1 (Order 1 604A), 3 (Orders 3-5 604C-604E), and 1 (Order 7 604G), based on the generic item order sequence chart 600.

FIG. 6B depicts user streaks 608 from the generic item order sequence chart 600, according to one embodiment. The user streaks 606 represent the longest streak of consecutive orders for each generic item 602. Returning to the example of milk 602A, the longest streak in the generic item order sequence chart 600 was 3, corresponding to Orders 3-5 604C-604E in FIG. 6A. Therefore, the order analyzer selects 3 as the user streak for milk 602A.

Figure 7:
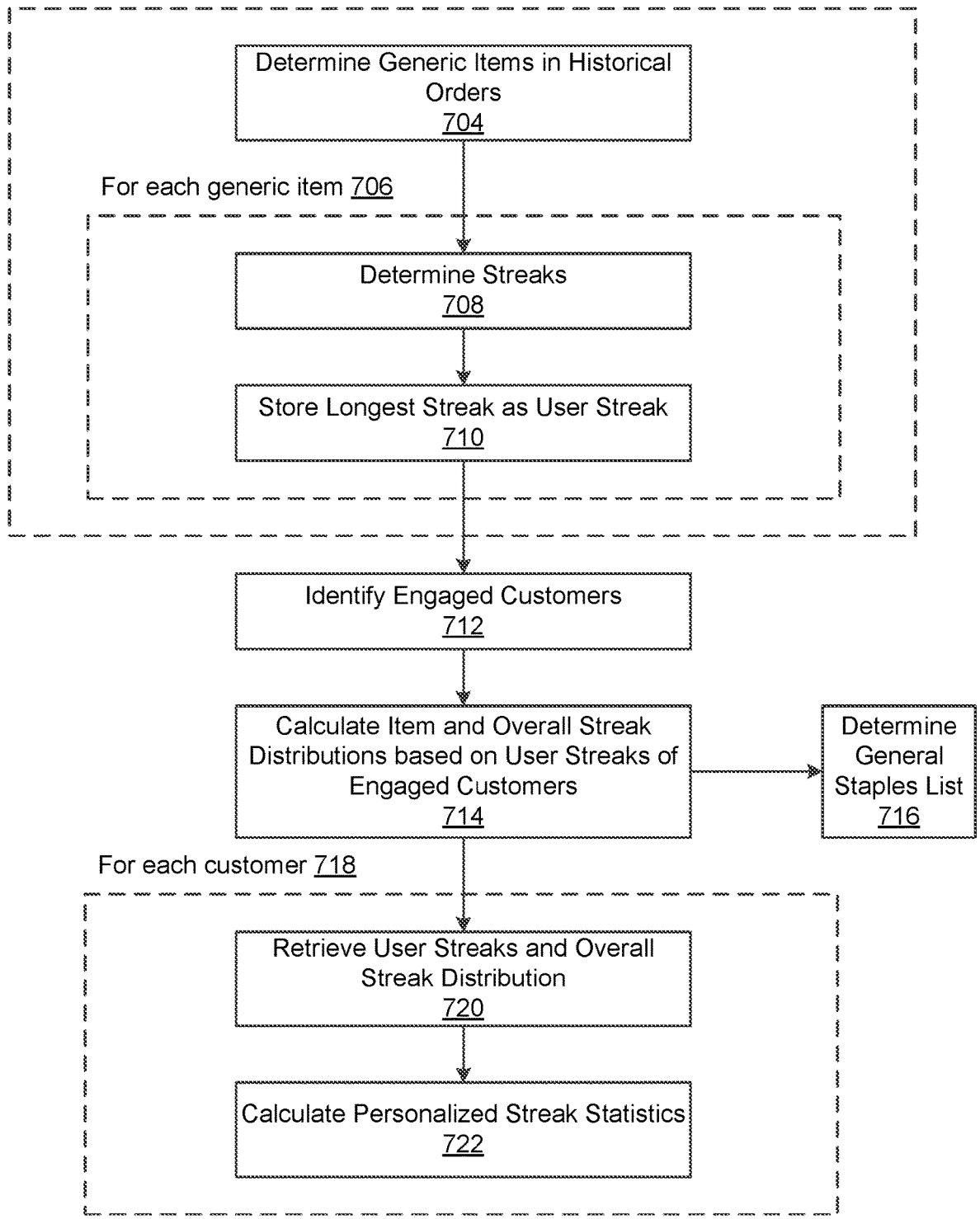
FIG. 7 is a flowchart illustrating a method for determining streak statistics, according to one embodiment.

FIG. 7 is a flowchart 700 illustrating a method for determining streak statistics, according to one embodiment. For each customer 702, the order analyzer 406 determines user streaks. The order analyzer 406 determines 704 generic items in historical orders using the order history database 402 and the generic item database 404. In particular, the order analyzer 406 retrieves historical orders for the customer from the order history database 402, and accesses the generic item database 404 to identify a generic item identifier corresponding to each item in each historical order. In some embodiments, the generic item identifier corresponding to each item is then stored in the order history database 402 in association with each item or each order.

For each generic item 706 included in the customer's historical orders, the order analyzer 406 determines 708 streaks, such as the examples shown in FIG. 6A. The order analyzer 406 identifies the longest streak and stores 710 the longest streak as the user streak for the customer in the streak database 408. The order analyzer 406 stores the user streak for each generic item ordered by a customer, and repeats this process for each customer 702, or a subset of customers (e.g., customers who are eligible to receive a customer staples list).

Once the user streaks are determined and stored, the order analyzer 406 identifies 712 engaged customers, whose streaks are used to calculate item streak distributions and an overall streak distribution. Engaged customers may be, e.g., customers who have been using the online concierge system 102 for longer than a time threshold and have placed at least a threshold number of orders. The order analyzer 406 calculates 714 item streak distributions and an overall streak distribution based on the user streaks of the engaged customers. Based on the item streak distributions and the overall streak distributions, the general staple model 410 calculates item streak statistics and, based on the item streak statistics, determines 716 a general staples list.

For each customer 718, or each of a subset of customers (e.g., customers eligible to receive a customer staples list), the personal staple model 412 retrieves 720 user streaks and the overall streak distribution from the streak database 408. The personal staple model 412 calculates 722 personalized streak statistics for the customer and stores the personalized streak statistics in the streak database 408.

Figure 8:
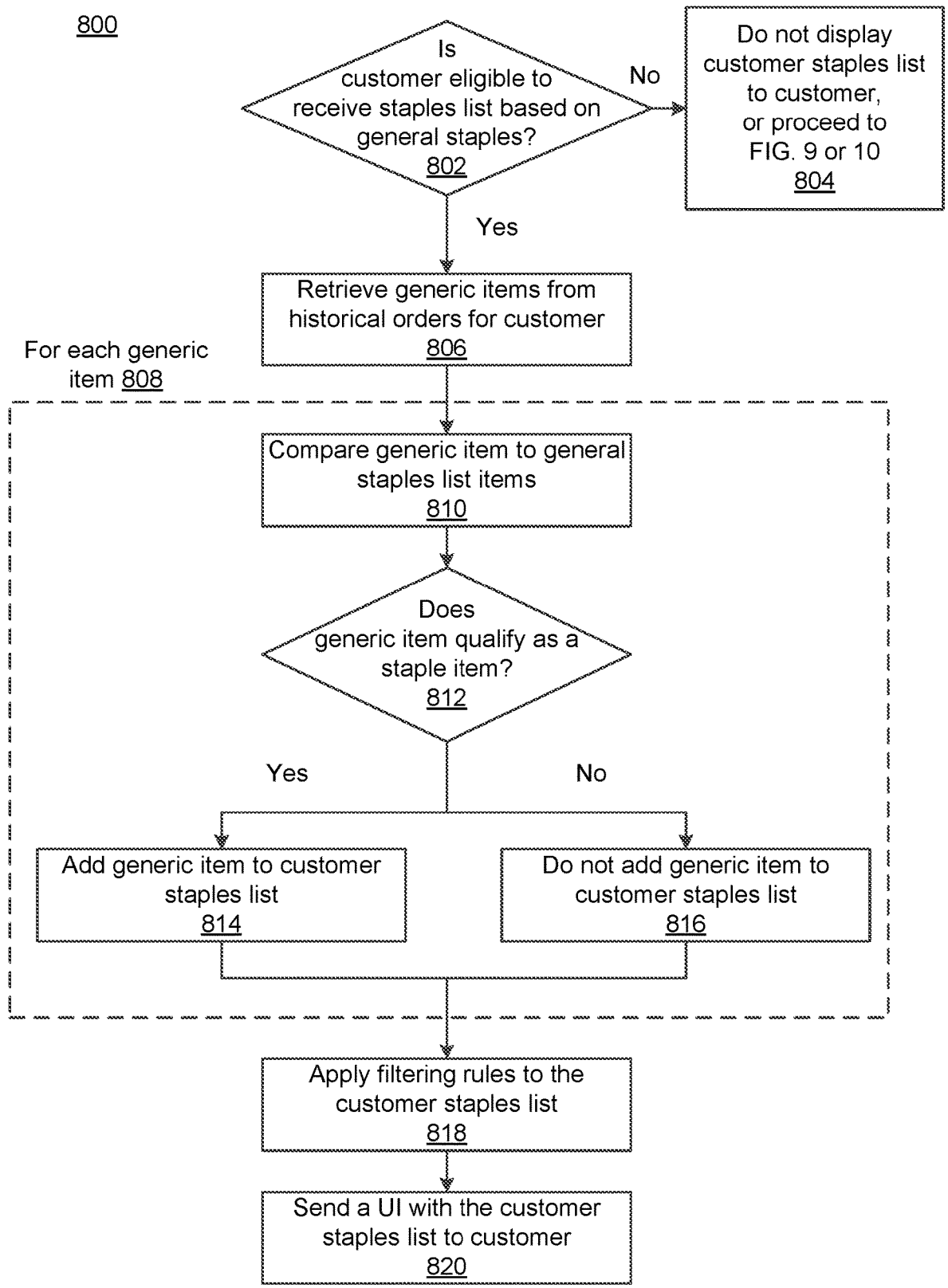
FIG. 8 is a flowchart illustrating a method for populating a customer staples list for a newer customer, according to one embodiment.

FIG. 8 is a flowchart 800 illustrating a method for populating a customer staples list for a newer customer, according to one embodiment. The staple generator 414 determines 802 if the customer is eligible to receive a customer staples list based on the general staples. For example, in response to a customer accessing the customer mobile application 106, the staple generator 414 determines if the customer is eligible to receive a customer staples list based on a number and recency of previous orders (e.g., at least three orders within the past two months, but not more than ten orders in the past six months) placed by the customer. If the customer is not eligible, the staple display generator 416 either does not display 804 a customer staples list (e.g., if the customer has not placed a requisite number of orders yet), or proceeds to the method shown in FIG. 9 or 10 (e.g., if the customer has placed numerous orders with the online concierge system 102).

If the customer is eligible to receive a customer staples list based on the general staples list, the staple generator 414 retrieves 806 generic items from historical orders for the customer by accessing the customer's historical orders from the order history database 402 and determining the generic items corresponding to the items included in the historical orders by accessing the generic item database 404. In some embodiments, the staple display generator 416 selects a subset of the retrieved generic items, e.g., generic items that have been ordered in at least 50% of the customer's previous orders.

For each generic item 808 previously ordered by the customer, or the subset of the previously ordered generic items, the staple generator 414 compares 810 the generic item to the general staples list. The staple generator 414 determines 812 if the generic item qualifies as a staple item, i.e., if the generic item is included in the general staples list. If the generic item does qualify, the staple generator 414 adds 814 the generic item to a customer staples list for the customer. If the generic item does not qualify, the staple generator 414 does not add 816 the generic item to the customer staples list for the customer. Once the staple generator 414 has repeated this process for each generic item 808, the staple generator 414 applies 818 one or more filtering rules, e.g., one or more of the frequency rule, the order number rule, and the recency rule described with respect to FIG. 4, to the customer staples list. If one or more generic items on the customer staples list do not pass the filtering rules, the staples generator 414 removes these generic items from the customer staples list. The staple display generator 416 sends 820 the staples ordering interface 500 with the customer staples list for display on a client device of the customer. As described in relation to FIG. 5, the staple display generator 416 selects a specific item corresponding to each generic item in the customer staples list for display to the customer in the staples ordering interface 500. In some embodiments, the staple generator 414 stores the customer staples list in the staple database 418.

When the customer is a newer customer with fewer orders, the staple generator 414 relies mainly on the general staple list, as described with respect to FIG. 8. After the customer has placed a requisite number of orders (e.g., six orders or ten orders), and/or has used the online concierge system 102 for at least a requisite period of time (e.g., three months or six months), the staple generator 414 relies on personalized streak statistics to generate a more accurate list of staples for the customer. After the first few orders or months using the online concierge system 102, the customer has placed enough orders to generate reliable personalized streak statistics. In some embodiments, the staple generator 414 may gradually shift from relying more heavily on the general staple list to relying more heavily on using personalized streak statistics to determine the customer staples list. For example, the staple generator 414 may identify potential customer staple items using both the general staple list as described with respect to FIG. 8, and using personalized streak statistics, and select a set of items from the identified potential customer staple items. In other embodiments, after the customer reaches a threshold time using the online concierge system 102, the staple generator 414 switches over from using the general staple list to using personalized streak statistics to determine the customer staples list.

Figure 9:
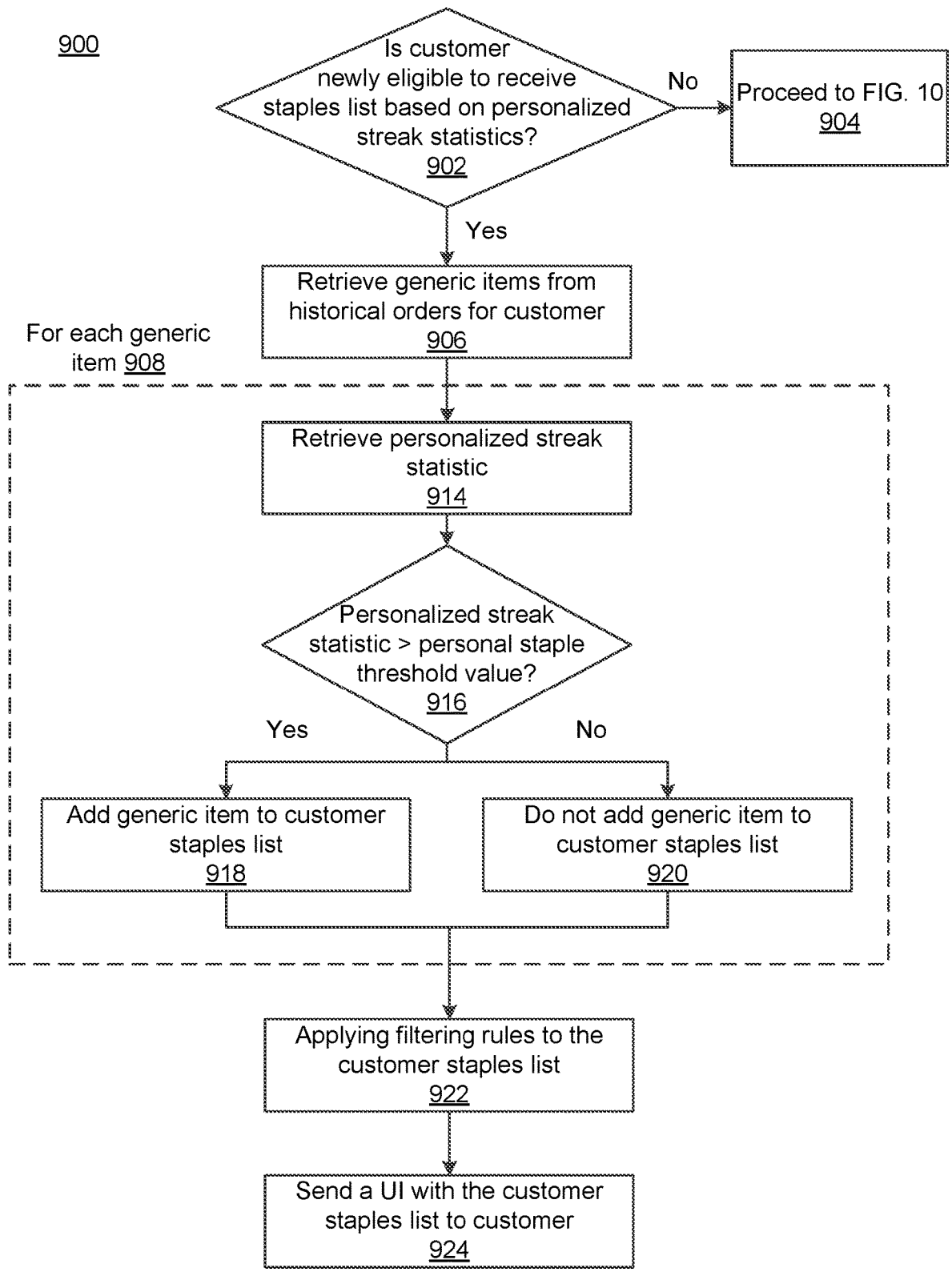
FIG. 9 is a flowchart illustrating a method for populating a customer staples list for a customer using personalized streak statistics, according to one embodiment.

FIG. 9 is a flowchart 900 illustrating a method for populating a customer staples list for a customer using personalized streak statistics, according to one embodiment. The staple generator 414 determines 902 if the customer is newly eligible to receive a customer staples list based on personalized streak statistics for the customer, i.e., if personalized streak statistics have not been determined for the customer previously. If the customer is not newly eligible, the staple generator 414 proceeds to FIG. 10. If the customer is newly eligible, the staple display generator 414 retrieves 906 generic items from historical orders for the customer by accessing the customer's historical orders from the order history database 402 and determining the generic items corresponding to the items included in the historical orders by accessing the generic item database 404.

For each generic item 908, the staple generator 414 retrieves the associated personalized streak statistic from the streak database 408. If the personalized streak statistics have not been previously calculated for the customer, the staple generator 414 instructs the personal staple model 412 to compute the personalized streak statistics for the generic items. The staple generator 414 compares 916 the personalized streak statistic to the personal staple threshold value. If the personalized streak statistic is greater than the personal staple threshold value, the staple generator 414 adds 918 the generic item to the customer staples list. If the personalized streak statistic is not greater than the personal staple threshold value, the staple generator 414 does not add 920 the generic item to the customer staples list. Once the staple generator 414 has repeated this process for each generic item 908, the staple generator 414 applies 922 the filtering rules, e.g., one or more of the frequency rule, the order number rule, and the recency rule described with respect to FIG. 4, to the customer staples list. If one or more generic items on the customer staples list do not pass the filtering rules, the staples generator 414 removes these generic items from the customer staples list. The staple display generator 416 sends 924 the staples ordering interface 500 with the customer staples list to the customer for display on a client device of the customer. As described in relation to FIG. 5, the staple display generator 416 selects a specific item corresponding to each generic item in the customer staples list for display to the customer in the staples ordering interface 500. In some embodiments, the staple generator 414 stores the customer staples list in the staple database 418.

Figure 10:
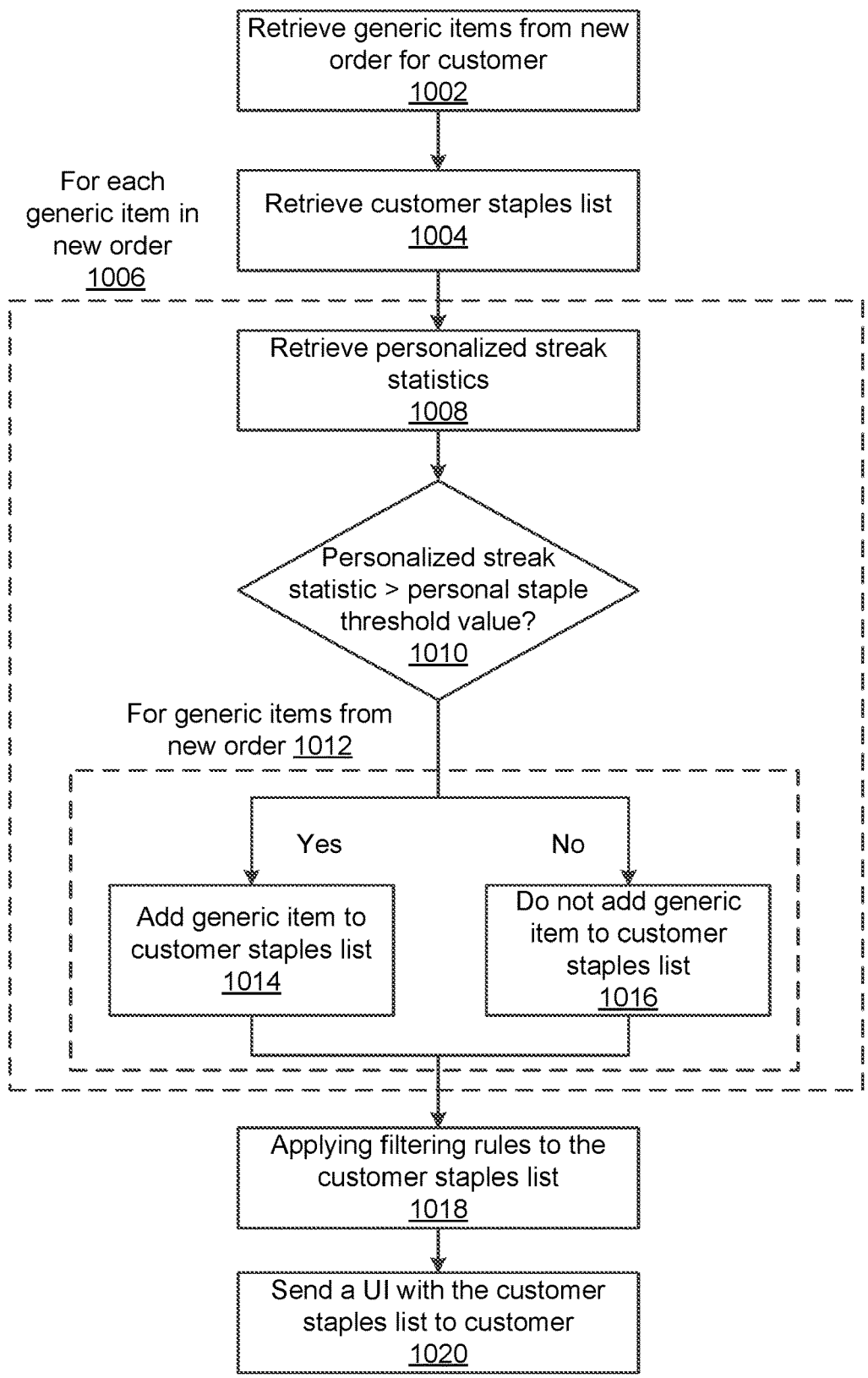
FIG. 10 is a flowchart illustrating a method for adding and removing staple items from a customer staples list, according to one embodiment.

FIG. 10 is a flowchart 1000 illustrating a method for adding and removing staple items from a customer staples list, according to one embodiment. This method is performed to update a customer staples list in response to receiving a new order from the customer, based on updated personalized streak statistics for the customer. When a customer places a new order, the staple generator 414 accesses the items included in the new order and determines the generic items corresponding to the items included in the historical orders by accessing the generic item database 404. The staple generator 414 also retrieves 1004 the generic items in the customer staples list for the customer from the staple database 418.

For each generic item 1006 in the new order, the staple generator 414 retrieves 914 the personalized streak statistic from the streak database 408. For generic items in the new order, the personalized streak statistics may change based on the most recent order if the new order continues a user streak. For example, if the previous user streak for milk included the last 4 consecutive orders, and the customer again ordered milk in the most recent order, the user streak for milk is updated to 5, which changes the personalized streak statistic. Based on the new order, the order analyzer 406 updates the user streaks for the customer, and the personal staple model 412 updates the personalized streak statistics for the generic items included in the order based on the updated user streaks.

Having retrieved the personalized streak statistics, which reflect any updates based on the new order, the staple generator 414 compares 1010 each personalized streak statistic to the personal staple threshold value. For generic items from the new order 1012, if the personalized streak statistic is greater than the personal staple threshold value, the staple generator 414 adds 1014 the generic item to the customer staples list. Otherwise, the staple generator 414 does not add 1016 the generic item to the customer staples list. Once the customer staples list has been updated for each generic item, the staple generator 414 applies 1018 the filtering rules, e.g., one or more of the frequency rule, the order number rule, and the recency rule described with respect to FIG. 4, to the customer staples list. If one or more generic items on the customer staples list do not pass the filtering rules, the staples generator 414 removes these generic items from the customer staples list. The staple display generator 416 sends 1020 the staples ordering interface 500 with the customer staples list to the customer for display on a client device of the customer. As described in relation to FIG. 5, the staple display generator 416 selects a specific item corresponding to each generic item in the customer staples list for display to the customer in the staples ordering interface 500. In some embodiments, the staple generator 414 stores the customer staples list in the staple database 418.

Figure 11:
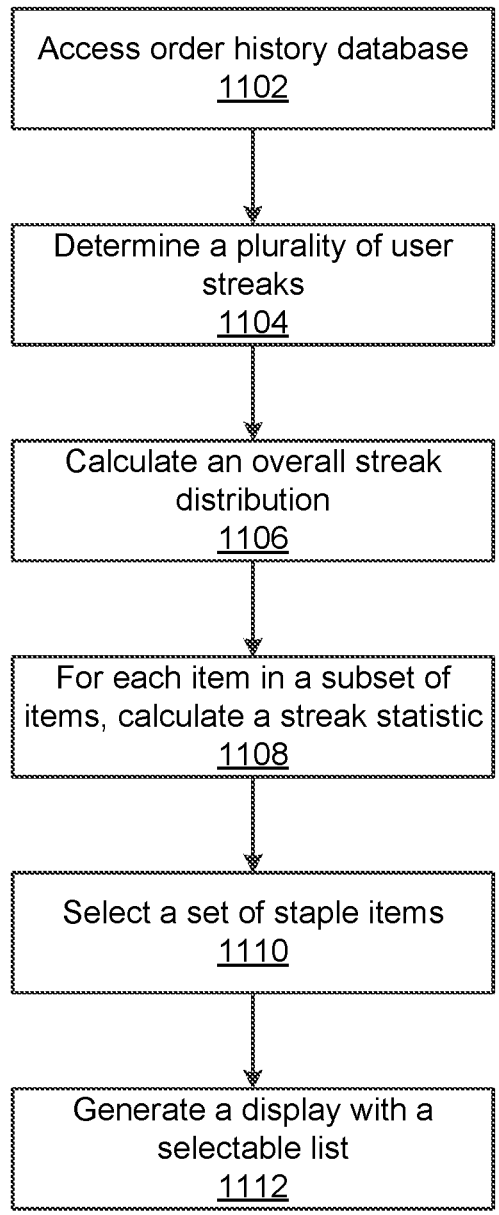
FIG. 11 is a flowchart illustrating a method for generating a display with a staples list, according to one embodiment.

FIG. 11 is a flowchart illustrating a method for generating a display with a staples list, according to one embodiment. To generate the display, the order interface engine 216, described in FIG. 4, accesses 1102 the order history database 402. The order history database 402 describes a plurality of historical orders for a plurality of users. Each historical order in the order history database 402 comprises a list of items selected by a respective user form a plurality of items (e.g., items available for purchase). The order interface engine 216 determines 1104 a plurality of user streaks. Each user streak is based on a number of consecutive orders placed by a respective user of the plurality of users that include a respective item of the plurality of items. The order interface engine 216 calculates 1106 an overall streak distribution for the plurality of items based on the plurality of user streaks. For each item of at least a subset of the plurality of items, the order interface engine 216 calculates 1108 a streak statistic for the item. The streak statistic is based on a corresponding subset of the plurality of user streaks and the overall streak distribution. The order interface engine 216 selects 1110 a set of staples items for a particular user based on the streak statistics for the set of staple items and generates 1112 a display for the particular user with a selectable list. The particular user may populate an order using the display using the selectable list of the selected set of staple items.

It is appreciated that although FIG. 11 illustrates a number of interactions according to one embodiment, the precise interactions and/or order of interactions may vary in different embodiments. For example, in some embodiments, the order interface engine applies 216 filtering rules to the set of staple items before generating 1112 the display with the selectable list.

Other Considerations

The present invention has been described in particular detail with respect to one possible embodiment. Those of skill in the art will appreciate that the invention may be practiced in other embodiments. First, the particular naming of the components and variables, capitalization of terms, the attributes, data structures, or any other programming or structural aspect is not mandatory or significant, and the mechanisms that implement the invention or its features may have different names, formats, or protocols. Also, the particular division of functionality between the various system components described herein is merely for purposes of example, and is not mandatory; functions performed by a single system component may instead be performed by multiple components, and functions performed by multiple components may instead performed by a single component.

Some portions of above description present the features of the present invention in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by real time network operating systems.

The present invention also relates to an apparatus for performing the operations herein. This apparatus may be specially constructed for the required purposes, or it may comprise a general-purpose computer selectively activated or reconfigured by a computer program stored on a computer readable medium that can be accessed by the computer. Such a computer program may be stored in a non-transitory computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of computer-readable storage medium suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will be apparent to those of skill in the art, along with equivalent variations. In addition, the present invention is not described with reference to any particular programming language. It is appreciated that a variety of programming languages may be used to implement the teachings of the present invention as described herein, and any references to specific languages are provided for invention of enablement and best mode of the present invention.

The present invention is well suited to a wide variety of computer network systems over numerous topologies. Within this field, the configuration and management of large networks comprise storage devices and computers that are communicatively coupled to dissimilar computers and storage devices over a network, such as the Internet.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the following claims.

What is claimed is:

1. A computer-implemented method for populating a shopping list, the method comprising:
   accessing an order history database comprising data describing a plurality of historical orders for a plurality of users, each historical order comprising a list of items selected by a respective user from a plurality of items;
   applying a machine-learned model to the list of items in each historical order to determine a set of generic items corresponding to the plurality of items;
   determining a plurality of user streaks, each user streak based on a number of consecutive historical orders for a respective user of the plurality of users that include an item corresponding to a generic item of the set of generic items;
   calculating an overall streak distribution for the generic items in the set based on the plurality of user streaks, wherein the overall streak distribution comprises an average streak of the plurality of user streaks and a standard deviation of the plurality of user streaks;
   calculating, for each generic item of at least a subset of the set of generic items, a streak statistic for the generic item by normalizing a streak distribution of the generic item with the overall streak distribution, the streak statistics further based on a number of user streaks for the generic item and a number of user streaks for all generic items in the set;
   selecting, based on the subset of the set of generic items, a set of staple items for a particular user based on the streak statistics for the set of staple items; and
   generating for display a staples ordering interface for the particular user, the staples ordering interface comprising a selectable list of the selected set of staple items.

2. The computer-implemented method of claim 1, wherein calculating, for each item of at least a subset of the set of generic items, a streak statistic further comprises:
   calculating a plurality of streak distributions, each streak distribution corresponding to on a respective generic item of the set of generic items and a respective set of user streaks of the plurality of user streaks;
   calculating a plurality of item streak statistics for the set of generic items, each item streak statistic based on the streak distribution for the item and the overall streak distribution.

3. The computer-implemented method of claim 2, wherein selecting, based on the subset of the set of generic items, a set of staple items for a particular user based on the streak statistics for the set of staple items comprises:
   selecting a set of generic staples items from the set of generic items based on the item streak statistics;
   comparing the generic staples items to items previously ordered by the particular user to determine generic staples items previously ordered by the particular user; and
   selecting the generic staples items previously ordered by the particular user as the set of staple items for the particular user.

4. The method of claim 2, wherein each item streak statistic is calculated using a paired T-test based on the streak distribution for the generic item and the overall streak distribution.

5. The computer-implemented method of claim 1, wherein calculating, for each generic item of at least a subset of the plurality of items, a streak statistic further comprises:
   calculating, for the particular user, a plurality of personalized streak statistics based on the plurality of user streaks for the particular user and the overall streak distribution, wherein the subset of the plurality of items comprises items previously ordered by the particular user.

6. The computer-implemented method of claim 5, wherein selecting, based on the subset of the set of generic items, a set of staple items for a particular user based on the streak statistics for the set of staple items comprises:
   comparing the personalized streak statistic for each generic item in the subset of the set of generic items to a personal staple threshold value; and
   in response to determining that a generic item of the subset has a personalized streak statistic greater than the personal staple threshold value, selecting the generic item as a staple item.

7. The computer-implemented method of claim 1, the method further comprising:
   receiving a selection, from the particular user, of a subset of the selected set of staple items from the staples ordering interface;
   receiving a user command to add the subset of the selected set of staple items to an order; and
   adding the subset of the selected items to an online shopping cart.

8. The computer-implemented method of claim 1, wherein the staples ordering interface comprises:
   a first button that allows the particular user to select all of the staple items in the selectable list to be added to the order;

a second button that allows the particular user to select none of the staple items in the selectable list to be added to the order, and a quantity selector correspond to each staple item in the selectable list, each quantity selector configured to receive, from the particular user, a selection of a quantity of the corresponding staple item to be added to the order.

9. The computer-implemented method of claim 1, the method further comprising filtering the set of staple items by:

determining, for each staple item of the set of staple items, a set of historical data from the order history database describing previous orders by the particular user, the set of historical data including, for each staple item of the set of staple items, a frequency, an order number, and a time of last purchase; and removing, from the set of staple items, staple items that do not satisfy a set of filtering rules, wherein the filtering rules compare the frequency to a frequency threshold, the order number to an order number threshold, and the last time of purchase to a recency threshold.

10. The computer-implemented method of claim 1, further comprising:

selecting, based on historical orders of the particular user, a particular item corresponding to each generic item in the selected set of staple items, wherein the staples ordering interface comprising a selectable list of the selected particular items.

11. A non-transitory computer-readable storage medium storing computer program instructions executable by a processor to perform operations comprising:

accessing an order history database comprising data describing a plurality of historical orders for a plurality of users, each historical order comprising a list of items selected by a respective user from a plurality of items;

applying a machine-learned model to the list of items in each historical order to determine a set of generic items corresponding to the plurality of items;

determining a plurality of user streaks, each user streak based on a number of consecutive historical orders for a respective user of the plurality of users that include an item corresponding to a generic item of the set of generic items;

calculating an overall streak distribution for the generic items in the set based on the plurality of user streaks, wherein the overall streak distribution comprises an average streak of the plurality of user streaks and a standard deviation of the plurality of user streaks;

calculating, for each generic item of at least a subset of the set of generic items, a streak statistic for the generic item by normalizing a streak distribution of the generic item with the overall streak distribution, the streak statistics further based on a number of user streaks for the generic item and a number of user streaks for all generic items in the set;

selecting, based on the subset of the set of generic items, a set of staple items for a particular user based on the streak statistics for the set of staple items; and generating for display a staples ordering interface for the particular user, the staples ordering interface comprising a selectable list of the selected set of staple items.

12. The computer-readable storage medium of claim 11, wherein calculating, for each item of at least a subset of the set of generic items, a streak statistic further comprises:

calculating a plurality of streak distributions, each streak distribution corresponding to on a respective generic item of the set of generic items and a respective set of user streaks of the plurality of user streaks;

calculating a plurality of item streak statistics for the set of generic items, each item streak statistic based on the streak distribution for the item and the overall streak distribution.

13. The computer-readable storage medium of claim 12, wherein selecting, based on the subset of the set of generic items, a set of staple items for a particular user based on the streak statistics for the set of staple items comprises:

selecting a set of generic general staples items from the set of generic items based on the item streak statistics;

comparing the generic staples items to items previously ordered by the particular user to determine generic staples items previously ordered by the particular user; and selecting the generic staples items previously ordered by the particular user as the set of staple items for the particular user.

14. The computer-readable storage medium of claim 12, wherein each item streak statistic is calculated using a paired T-test based on the streak distribution for the generic item and the overall streak distribution.

15. The computer-readable storage medium of claim 11, wherein calculating, for each generic item of at least a subset of the plurality of items, a streak statistic further comprises:

calculating, for the particular user, a plurality of personalized streak statistics based on the plurality of user streaks for the particular user and the overall streak distribution, wherein the subset of the plurality of items comprises items previously ordered by the particular user.

16. The computer-readable storage medium of claim 15, wherein selecting, based on the subset of the set of generic items, a set of staple items for a particular user based on the streak statistics for the set of staple items comprises:

comparing the personalized streak statistic for each generic item in the subset of the set of generic items to a personal staple threshold value; and in response to determining that a generic item of the subset has a personalized streak statistic greater than the personal staple threshold value, selecting the generic item as a staple item.

17. The computer-readable storage medium of claim 11, the operations further comprising:

receiving a selection, from the particular user, of a subset of the selected set of staple items from the staples ordering interface;

receiving a user command to add the subset of the selected set of staple items to an order; and adding the subset of the selected items to an online shopping cart.

18. The computer-readable storage medium of claim 11, wherein the staples ordering interface comprises:

a first button that allows the particular user to select all of the staple items in the selectable list to be added to the order, a second button that allows the particular user to select none of the staple items in the selectable list to be added to the order, and a quantity selector correspond to each staple item in the selectable list, each quantity selector configured to receive, from the particular user, a selection of a quantity of the corresponding staple item to be added to the order.

19. The computer-readable storage medium of claim 11, the operations further comprising filtering the set of staple items by:
- determining, for each staple item of the set of staple items, a set of historical data from the order history database describing previous orders by the particular user, the set of historical data including, for each staple item of the set of staple items, a frequency, an order number, and a time of last purchase; and
- removing, from the set of staple items, staple items that do not satisfy a set of filtering rules, wherein the filtering rules compare the frequency to a frequency threshold, the order number to an order number threshold, and the last time of purchase to a recency threshold.

20. The computer-readable storage medium of claim 11, the operations further comprising:
- selecting, based on historical orders of the particular user, a particular item corresponding to each generic item in the selected set of staple items, wherein the staples ordering interface comprising a selectable list of the selected particular items.

\* \* \* \* \*